(12) United States Patent
Delaney

(10) Patent No.: US 7,549,499 B2
(45) Date of Patent: Jun. 23, 2009

(54) HYDRAULIC HYBRID FOUR WHEEL DRIVE

(75) Inventor: Patrick M. Delaney, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 700 days.

(21) Appl. No.: 11/073,299

(22) Filed: Mar. 3, 2005

(65) Prior Publication Data

US 2006/0197375 A1 Sep. 7, 2006

(51) Int. Cl.
*B60K 17/356* (2006.01)
(52) U.S. Cl. .................. 180/242; 180/243; 180/245; 180/6.3; 180/6.24; 180/422; 180/305; 180/306; 180/307; 180/308
(58) Field of Classification Search .......... 180/242, 180/243, 245, 6.3, 6.24, 422
See application file for complete search history.

(56) References Cited

U.S. PATENT DOCUMENTS

| | | | |
|---|---|---|---|
| 3,891,045 A * | 6/1975 | Pancella | ............ 180/6.3 |
| 3,892,283 A | 7/1975 | Johnson | |
| 3,903,696 A | 9/1975 | Carman | |
| 4,098,083 A | 7/1978 | Carman | |
| 4,215,545 A | 8/1980 | Morello et al. | |
| 4,240,515 A | 12/1980 | Kirkwood | |
| 4,242,922 A | 1/1981 | Baudoin | |
| 4,351,409 A | 9/1982 | Malik | |
| 4,372,414 A | 2/1983 | Anderson et al. | |
| 4,382,484 A | 5/1983 | Anderson et al. | |
| 4,387,783 A | 6/1983 | Carman | |
| 4,441,573 A * | 4/1984 | Carman et al. | ............ 180/165 |
| 4,813,510 A | 3/1989 | Lexen | |
| 4,986,383 A | 1/1991 | Evans | |
| 5,372,214 A * | 12/1994 | Haga et al. | ............ 180/422 |
| 5,540,299 A * | 7/1996 | Tohda et al. | ............ 180/243 |
| 5,564,519 A * | 10/1996 | Katoh et al. | ............ 180/243 |
| 5,607,027 A * | 3/1997 | Puett, Jr. | ............ 180/242 |
| 5,887,674 A | 3/1999 | Gray, Jr. | |
| 5,953,978 A * | 9/1999 | Bohner et al. | ............ 91/363 A |
| 6,712,166 B2 | 3/2004 | Rush et al. | |
| 7,044,257 B2 * | 5/2006 | Kempf et al. | ............ 180/305 |
| 2004/0118623 A1 | 6/2004 | Shore et al. | |

* cited by examiner

*Primary Examiner*—Paul N Dickson
*Assistant Examiner*—Marlon A Arce
(74) *Attorney, Agent, or Firm*—Jeffrey P. Calfa; Mark C. Bach; Gerald W. Askew

(57) ABSTRACT

An hybrid four wheel drive system characterized by a vehicle having a conventional rear wheel driveline as well as a conventional driving front steer axle powered by an hydraulic motor. The hybrid four wheel drive system is provided in multiple embodiments, particularly with and without an hydraulic pressure accumulator.

19 Claims, 13 Drawing Sheets

Figure 1:
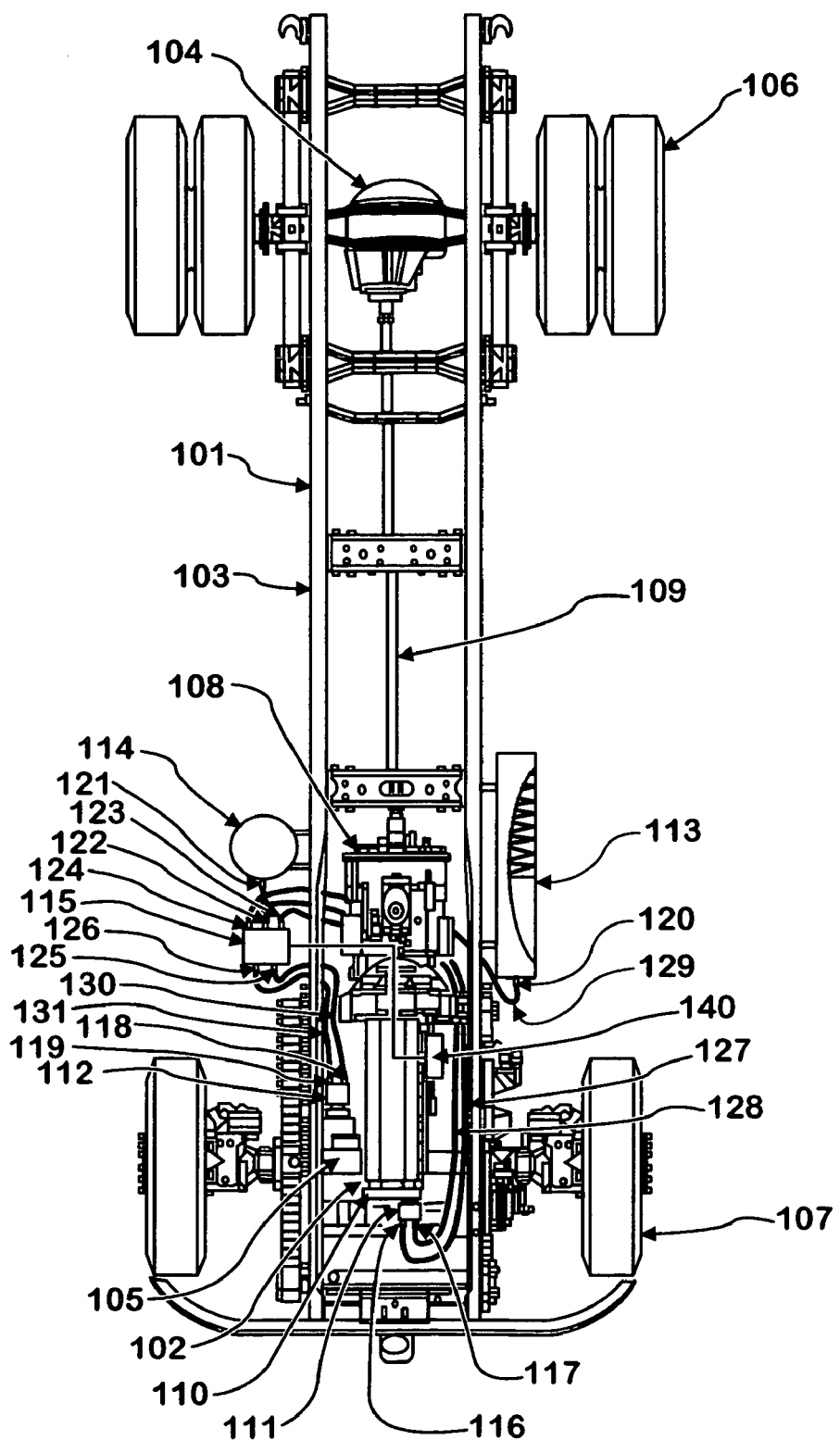

VEHICLE WITH HYDRAULIC
HYBRID FOUR-WHEEL DRIVE
WITH HYDRAULIC ACCUMULATOR

FLOW DIAGRAM SYSTEM
WITH ACCUMULATOR
"DRIVING"

VEHICLE WITH HYDRAULIC
HYBRID FOUR-WHEEL DRIVE
WITH HYDRAULIC ACCUMULATOR

VEHICLE WITH HYDRAULIC
HYBRID FOUR-WHEEL DRIVE
WITH HYDRAULIC ACCUMULATOR
& PTO-DRIVEN PUMP

VEHICLE WITH HYDRAULIC
HYBRID FOUR-WHEEL DRIVE
WITH HYDRAULIC ACCUMULATOR
AND CHASSIS MOUNTED MOTOR

FLOW DIAGRAM SYSTEM
WITH ACCUMULATOR
"DRIVING"

FLOW DIAGRAM SYSTEM WITH ACCUMULATOR "BRAKING"

FLOW DIAGRAM SYSTEM WITH ACCUMULATOR "STORING ENERGY"

FLOW DIAGRAM SYSTEM WITH ACCUMULATOR "RECOVERING ENERGY"

FLOW DIAGRAM SYSTEM
WITH ACCUMULATOR
"DRIVING & STORING ENERGY"

FLOW DIAGRAM SYSTEM WITH ACCUMULATOR
"DRIVING & RECOVERING ENERGY"

FLOW DIAGRAM SYSTEM WITH ACCUMULATOR "BRAKING & STORING ENERGY"

VEHICLE WITH HYDRAULIC
HYBRID FOUR-WHEEL DRIVE
WITHOUT HYDRAULIC ACCUMULATOR

FLOW DIAGRAM SYSTEM WITHOUT ACCUMULATOR "ENGINE BRAKING"

HYDRAULIC HYBRID FOUR WHEEL DRIVE

BACKGROUND OF INVENTION

This invention relates to a vehicle equipped with an hybrid four wheel drive system that is simpler to install than conventional four wheel drive systems, and may allow partial regenerative braking, depending on the configuration of the invention. Specifically, multiple embodiments are disclosed, all of which are characterized by a vehicle having a conventional rear wheel driveline as well as a conventional driving front axle. In lieu of a transfer case and front propeller shaft, as is often used in four wheel drive vehicles, the front axle is powered by an hydraulic motor. Pressurized hydraulic fluid is provided by an hydraulic pump driven by the vehicle main engine.

SUMMARY

Mobile vehicles, especially medium and heavy-duty commercial vehicles, are commonly configured with the engine located longitudinally forward of the cab and mounted to a set of frame rails, which form the structure of the vehicle. The engine is coupled to a transmission, which in turn provides power to one or more driving rear axles by means of a propeller shaft. For medium and heavy-duty vehicles having two wheel drive, the vehicle is typically provided with a simple front beam steering axle. For medium and heavy-duty vehicles having four wheel drive, or six wheel drive, as the case may be, the simple front beam axle is replaced by a conventional front drive steering axle. Power is provided to the conventional front drive steering axle by means of an additional propeller shaft, which is connected to a transfer case that is either driven by or integrated into the vehicle transmission.

There are several significant drawbacks to the typical four wheel drive configuration for medium and heavy-duty vehicles. The transfer case is heavy and consumes power, even when four wheel drive is not in use. It is prone to wear, and cannot be engaged during normal traction conditions, due to binding caused by rotational differential between front and rear axles. The front propeller shaft, located between the transfer case and the conventional front drive steering axle, passes through an area of the vehicle that is typically congested with hoses, tubes, and various pieces of vehicle hardware. Due to articulation of the vehicle front suspension, there is a large area surrounding the front propeller shaft that must remain clear of obstruction.

Currently, there is much prior art involving the use of hydraulic systems in vehicles to transmit power from the vehicle engine to the vehicle drive wheels. Many of these systems utilize an hydraulic pressure accumulator to store energy captured during vehicle braking. The presence of this hydraulic pressure accumulator in the prior art is due to a strong industry interest in increasing vehicle fuel efficiency, especially in conditions where the vehicle is required to start and stop repeatedly.

The invention disclosed herein provides an improvement over the prior art, while solving many problems associated with the typical four wheel drive configuration for medium and heavy-duty vehicles. Specifically, the invention retains the conventional front drive steering axle used on medium and heavy-duty four wheel drive vehicles. An hydraulic motor is coupled directly to the conventional front drive steering axle, and an hydraulic pump is mounted to the vehicle engine or Front Engine Accessory Drive (FEAD). Alternately, the hydraulic motor may be mounted to the vehicle frame, and coupled to the conventional front drive steering axle by a short propeller shaft. Also, the hydraulic pump may instead be coupled to a Power Take-Off (PTO) on the vehicle transmission.

In either case, the vehicle retains its conventional rear axle or axles, and drivetrain. In this way hydraulic hybrid four wheel drive may be implemented using conventional hardware, requiring very little modification to the design of a given medium or heavy-duty vehicle, while eliminating the bulky transfer case and front propeller shaft of the typical four wheel drive configuration.

In addition to the hydraulic motor and hydraulic pump, the invention provides an hydraulic reservoir of sufficient size to meet the requirements of the system, one or more control valves, and, optionally, an hydraulic pressure accumulator. The hydraulic motor, which is coupled to the conventional front drive steering axle, is capable not only of converting hydraulic power provided by the engine driven pump into rotational power that is then transmitted by the conventional front drive steering axle to the vehicle front wheels, but also of converting rotational power transmitted by the conventional front drive steering axle from the front wheels into hydraulic power that is then stored in the hydraulic pressure accumulator.

The one or more control valves direct pressurized hydraulic fluid between the engine driven hydraulic pump, the conventional front drive steering axle coupled hydraulic motor, and the hydraulic pressure accumulator depending on the demand conditions under which the vehicle is operating. These conditions will be referred to as "driving", "braking", "storing energy", and "recovering energy". Potentially, both "driving" and "storing energy" could take place concurrently. The same is true for "driving" and "recovering energy", as well as "braking" and "storing energy".

During "driving", hydraulic pressure is directed from the engine driven hydraulic pump to the conventional front drive steering axle coupled hydraulic motor. The hydraulic pressure accumulator is isolated from the system, and little or no makeup volume is taken from the hydraulic reservoir. This condition occurs when the amount of power required by the conventional front drive steering axle is approximately equivalent to the amount of power provided by the engine driven hydraulic pump.

During "braking", hydraulic pressure is directed from the conventional front drive steering axle coupled hydraulic motor to the hydraulic pressure accumulator. The engine driven hydraulic pump is isolated from the system, either by allowing fluid to recirculate to it, or by virtue of its being a variable displacement pump with its displacement set to zero. Makeup volume to replace the fluid pumped into the hydraulic pressure accumulator is provided by the hydraulic reservoir. This condition occurs when the conventional front drive steering axle is being used to help slow the vehicle, and when it is desired to store part of the vehicle kinetic energy as potential energy in the hydraulic pressure accumulator for later use in propelling the vehicle.

During "storing energy", hydraulic pressure is directed from the engine driven hydraulic pump to the hydraulic pressure accumulator. The conventional front drive steering axle coupled hydraulic motor is isolated from the system by allowing fluid to recirculate to it. Makeup volume to replace the fluid pumped into the hydraulic pressure accumulator is provided by the hydraulic reservoir. This condition occurs when there is no demand for power at the front wheels, and when it is desired to store excess rotational energy being created by the vehicle engine as potential energy in the hydraulic pressure accumulator for later use in propelling the vehicle.

During "recovering energy", hydraulic pressure is directed from the hydraulic pressure accumulator to the conventional front drive steering axle coupled hydraulic motor. The engine driven hydraulic pump is isolated from the system in the same way as during "braking". Excess volume of hydraulic fluid created by the release of pressurized hydraulic fluid from the hydraulic pressure accumulator is returned to the hydraulic reservoir. This condition occurs when there is a demand for power at the front wheels, and when it is desired to return some of the potential energy stored in the hydraulic pressure accumulator to vehicle kinetic energy.

As noted previously, both "driving" and "storing energy" may take place concurrently. During this condition, hydraulic pressure is directed from the engine coupled hydraulic pump to both the conventional front drive steering axle coupled hydraulic motor and the hydraulic pressure accumulator. Makeup volume to replace the fluid pumped into the hydraulic pressure accumulator is provided by the hydraulic reservoir. This condition occurs when there is a demand for power at the front wheels, yet the engine is capable of producing more power than is needed to propel the vehicle. Some of this additional energy created by the vehicle engine is then stored as potential energy in the hydraulic pressure accumulator for later use in propelling the vehicle.

Both "driving" and "recovering energy" may also take place concurrently. During this condition, hydraulic pressure is directed both from the engine coupled hydraulic pump and from the hydraulic pressure accumulator to the conventional front drive steering axle coupled hydraulic motor. Excess volume of hydraulic fluid created by the release of pressurized hydraulic fluid from the hydraulic pressure accumulator is returned to the hydraulic reservoir. This condition occurs when there is a demand for more power at the front wheels than is being provided by the vehicle engine. In order to supplement the amount of power being provided by the vehicle engine, some of the potential energy stored in the hydraulic pressure accumulator is released into the system.

During the condition wherein both "braking" and "storing energy" are occurring, hydraulic pressure is directed both from the engine driven hydraulic pump and from the conventional front drive steering axle coupled hydraulic motor to the hydraulic pressure accumulator. Makeup volume to replace the fluid pumped into the hydraulic pressure accumulator is provided by the hydraulic reservoir. This condition occurs when the conventional front drive steering axle is being used to help slow the vehicle, and when it is desired to store energy being produced by the vehicle engine as potential energy in the hydraulic pressure accumulator for later use in propelling the vehicle. The power consumed by the engine driven hydraulic pump may assist in engine braking through the conventional drivetrain.

In the case of a system configured without an hydraulic pressure accumulator, among the aforementioned conditions, only "driving" may be accomplished. Some braking effect may be accomplished by controlling the displacement of the variable displacement engine driven pump, thereby transferring power back to the conventional drivetrain in order to enhance engine braking.

In any given configuration, means is provided for controlling the one or more control valves, and for coordinating flow of hydraulic pressure between system components. This means may be electronic or mechanical, or some combination thereof. It may also be automated, so that operation of the system is controlled automatically based on vehicle conditions and conventional vehicle operator inputs such as brake pedal or throttle actuation. Conversely, the control means may directly controllable by the vehicle operator.

The figures listed illustrate a vehicle with hydraulic hybrid four wheel drive. Both configurations with and without the hydraulic pressure accumulator are shown. Alternate configurations are shown for the conventional front drive steering axle coupled hydraulic motor, as well as for the engine driven hydraulic pump. Flow diagrams are given showing the various operating conditions, listed supra.

The invention as presented is a solution to the problem of providing an economical and simple four wheel drive for medium and heavy-duty commercial vehicles. It allows for installation of four wheel drive onto existing vehicles of this type, without significant revision of the basic vehicle geometry. Additionally, the invention is capable of at least partial regenerative braking, depending on its configuration.

DRAWINGS

Figure 2:
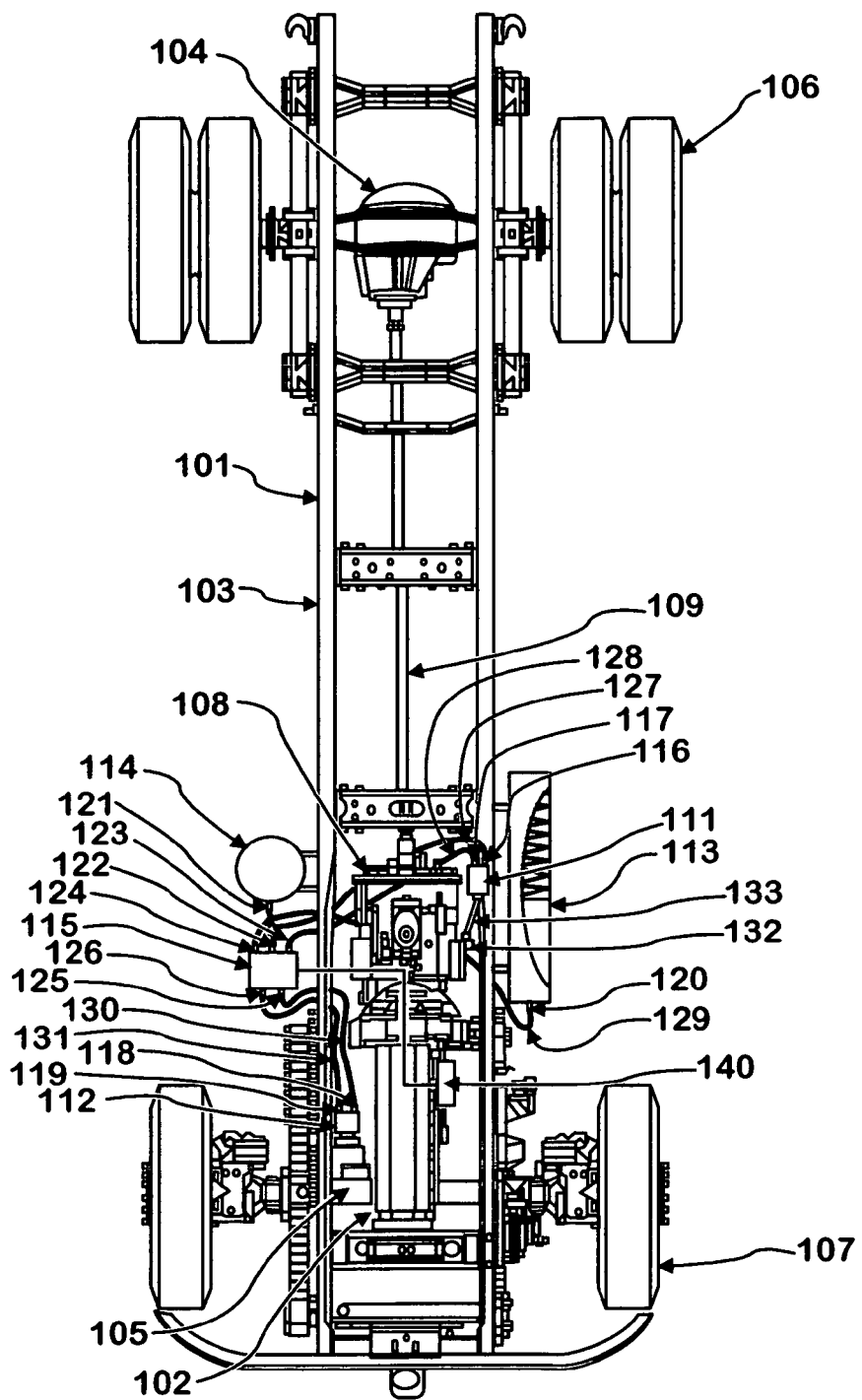

FIG. 1—A top view of a vehicle made in accordance with a first embodiment of the invention FIG. 2—A top view of a vehicle made in accordance with a second embodiment of the invention.

Figure 3:
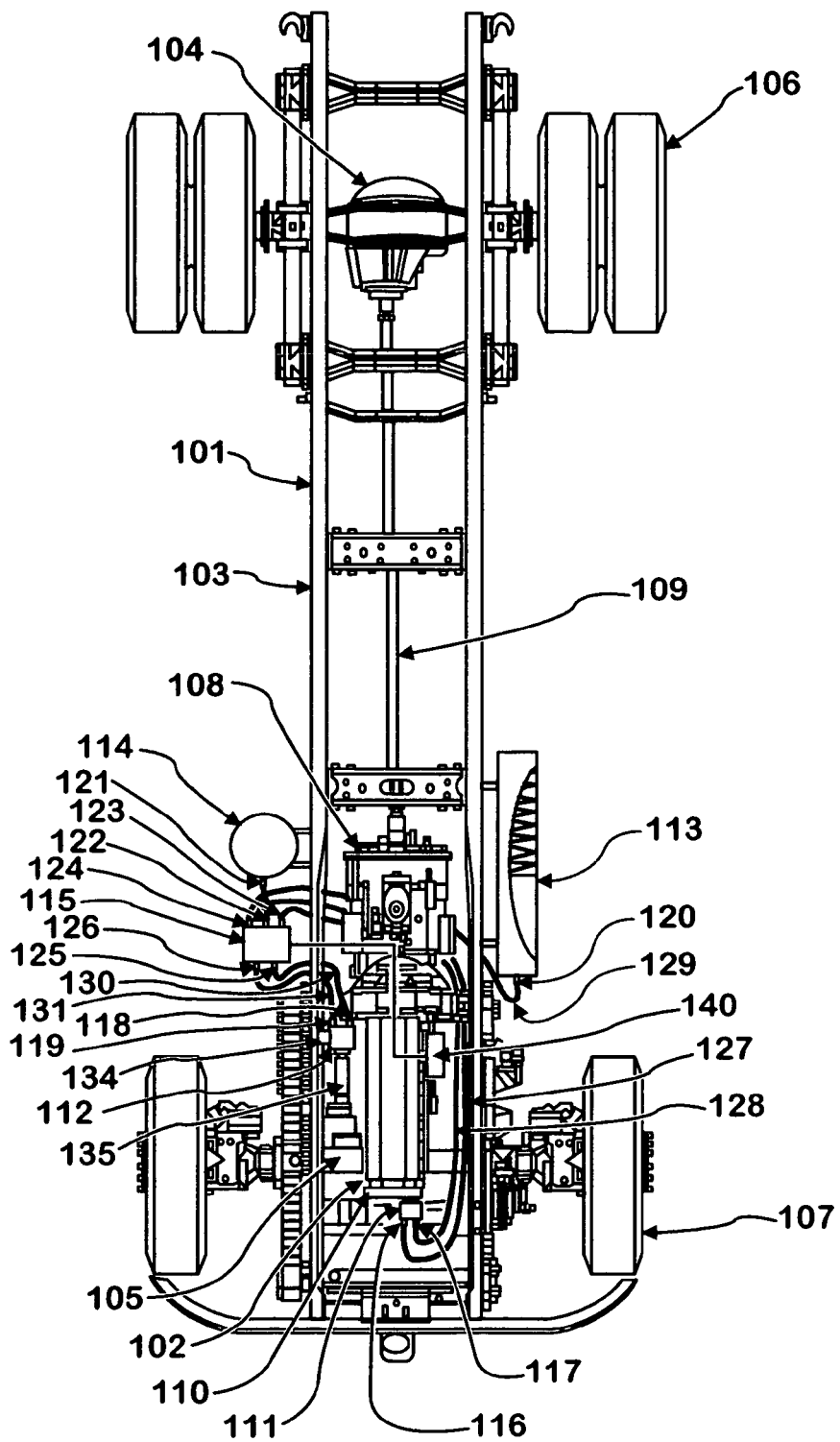

FIG. 3—A top view of a vehicle made in accordance with a third embodiment of the invention.

Figure 4:
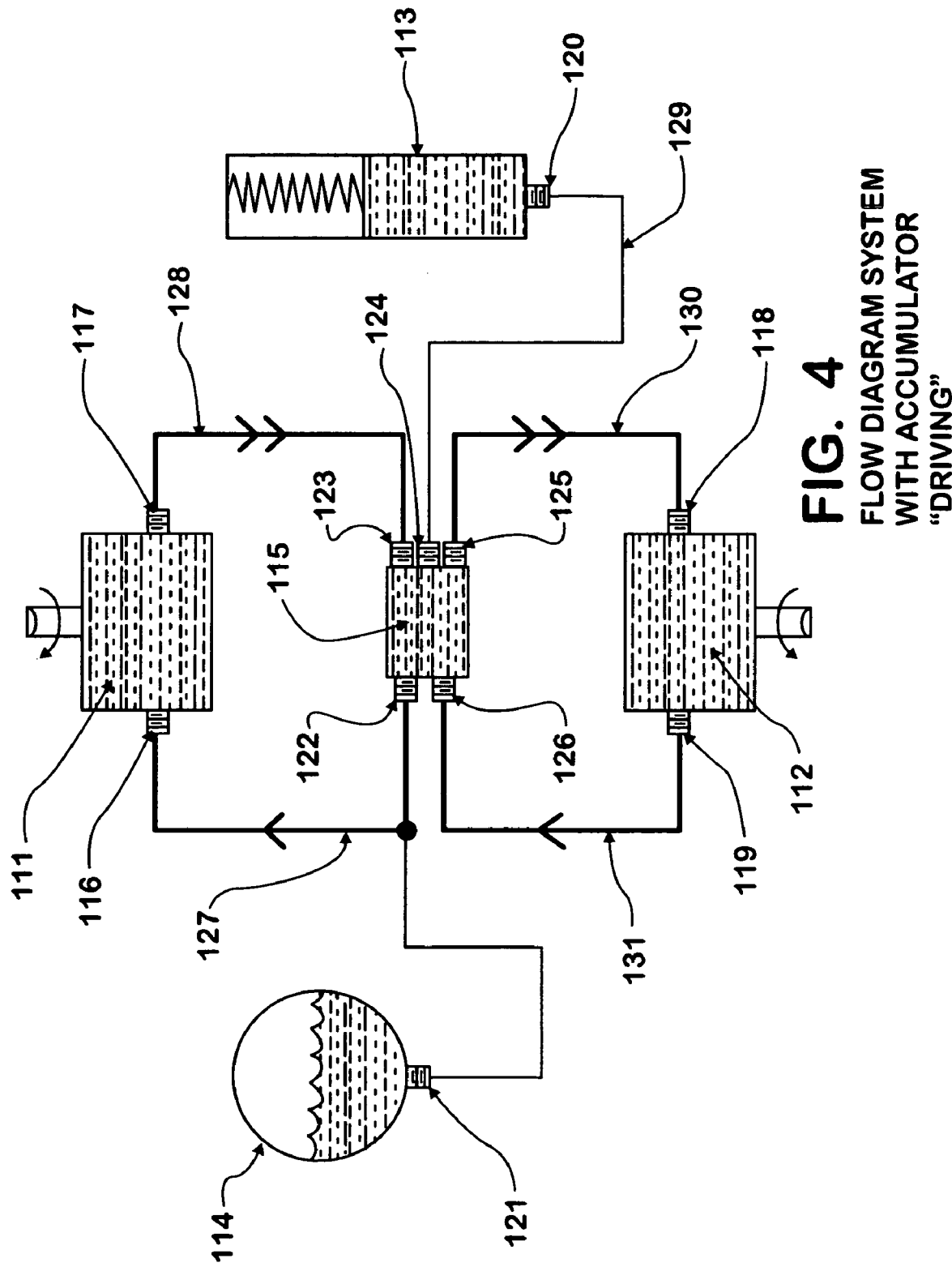

FIG. 4—A flow diagram of a vehicle made in accordance with the first, second, or third embodiments, operating under "driving" conditions.

Figure 5:
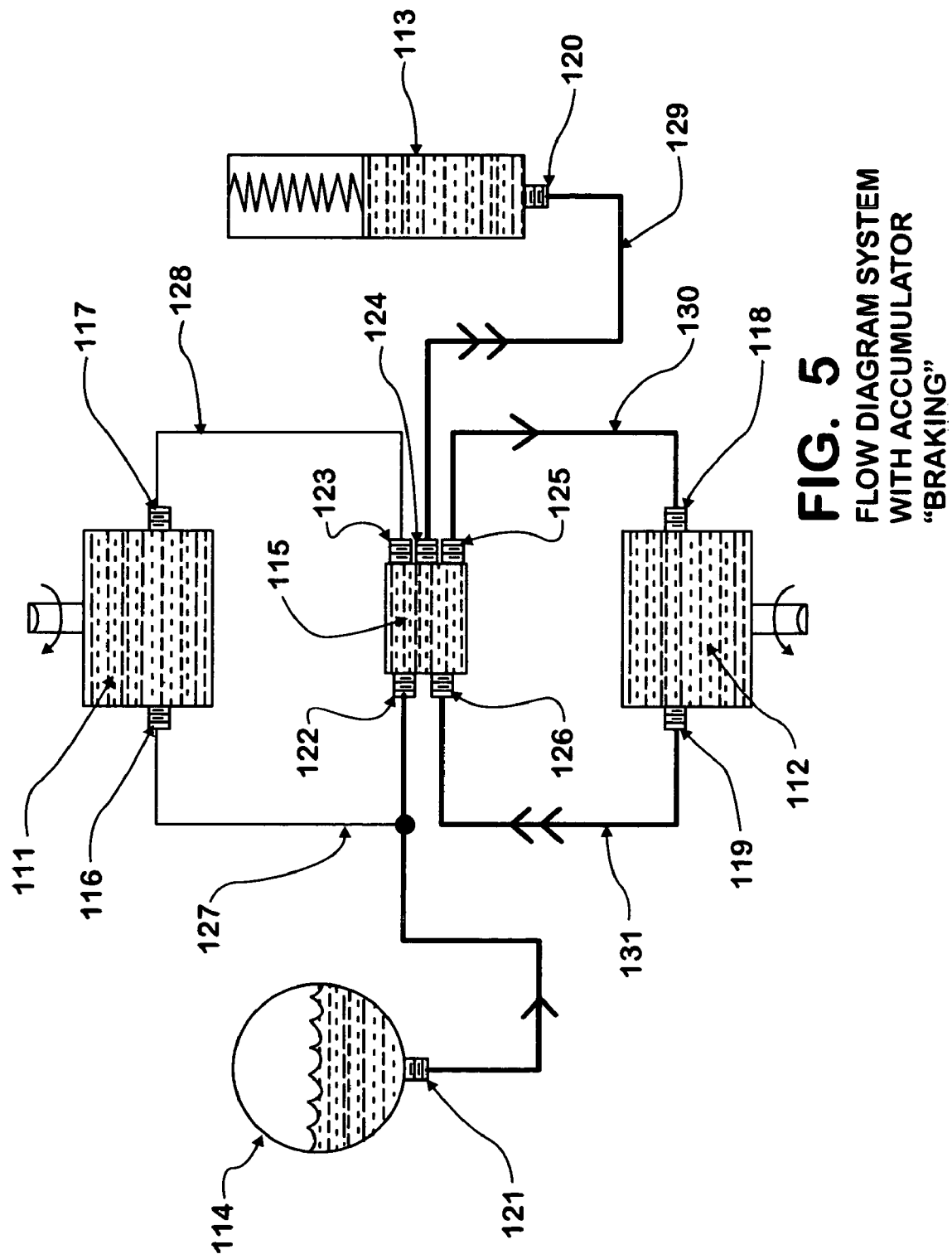

FIG. 5—A flow diagram of a vehicle made in accordance with the first, second, or third embodiments, operating under "braking" conditions.

Figure 6:
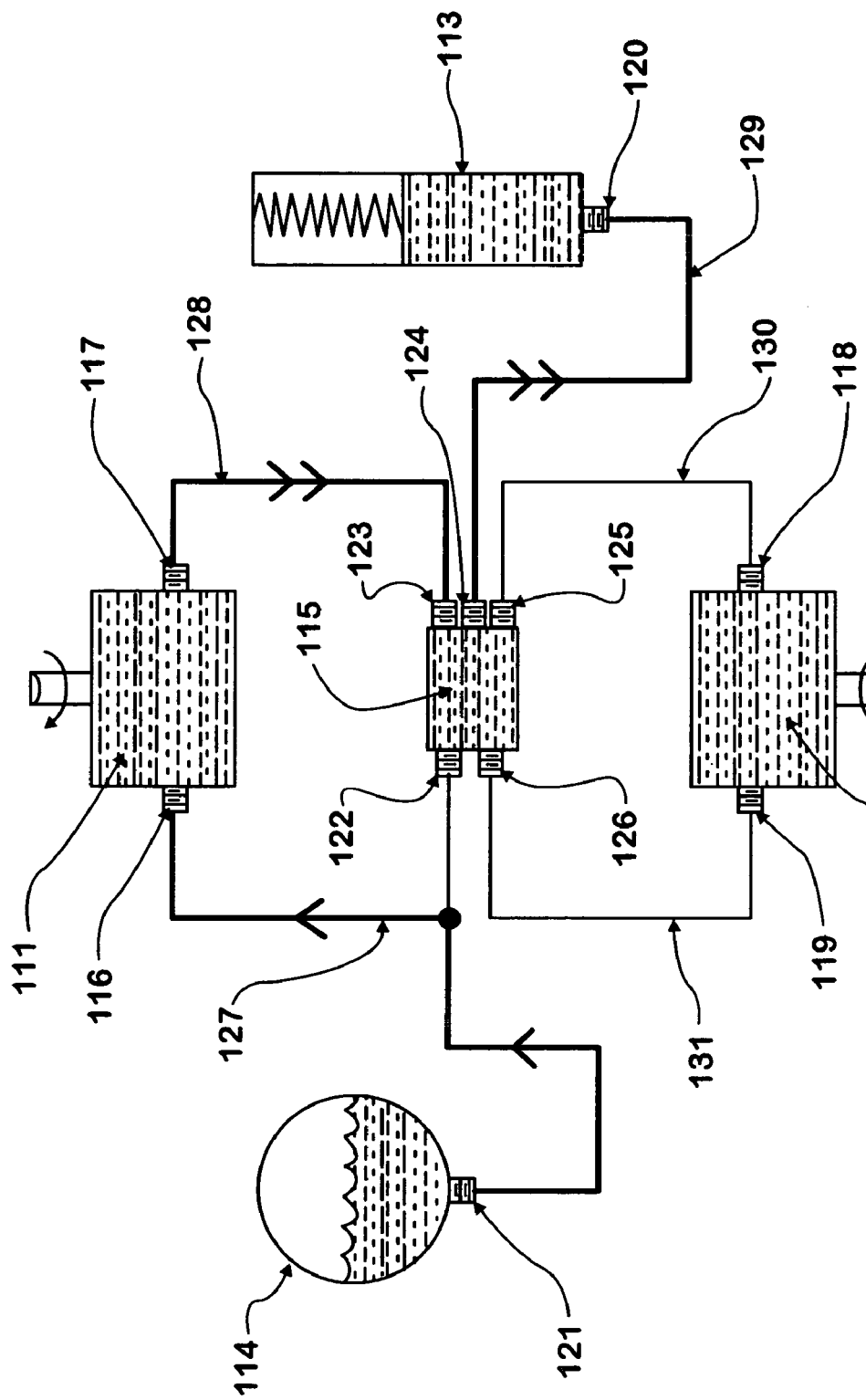

FIG. 6—A flow diagram of a vehicle made in accordance with the first, second, or third embodiments, operating under "storing energy" conditions.

Figure 7:
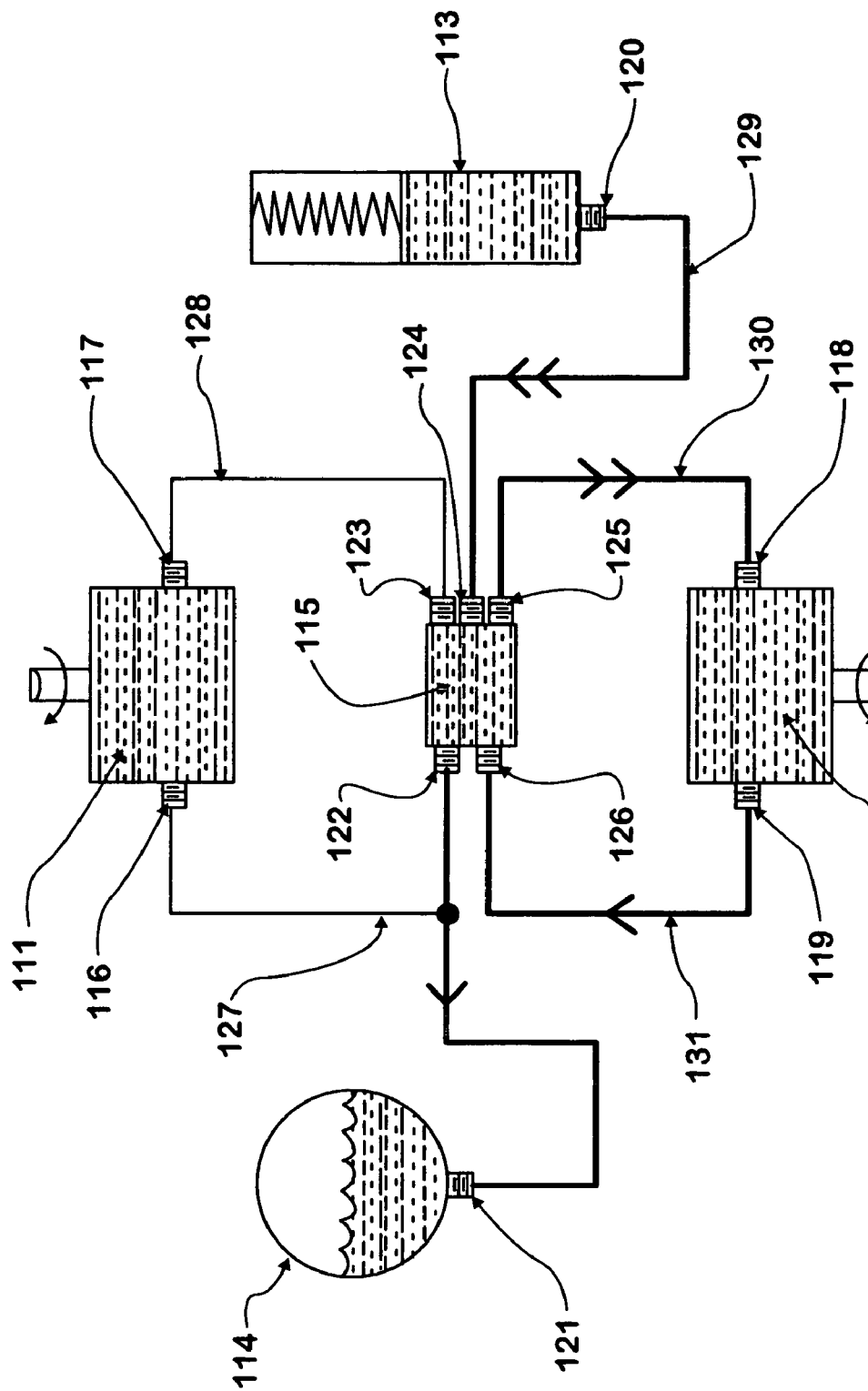

FIG. 7—A flow diagram of a vehicle made in accordance with the first, second, or third embodiments, operating under "recovering energy" conditions.

Figure 8:
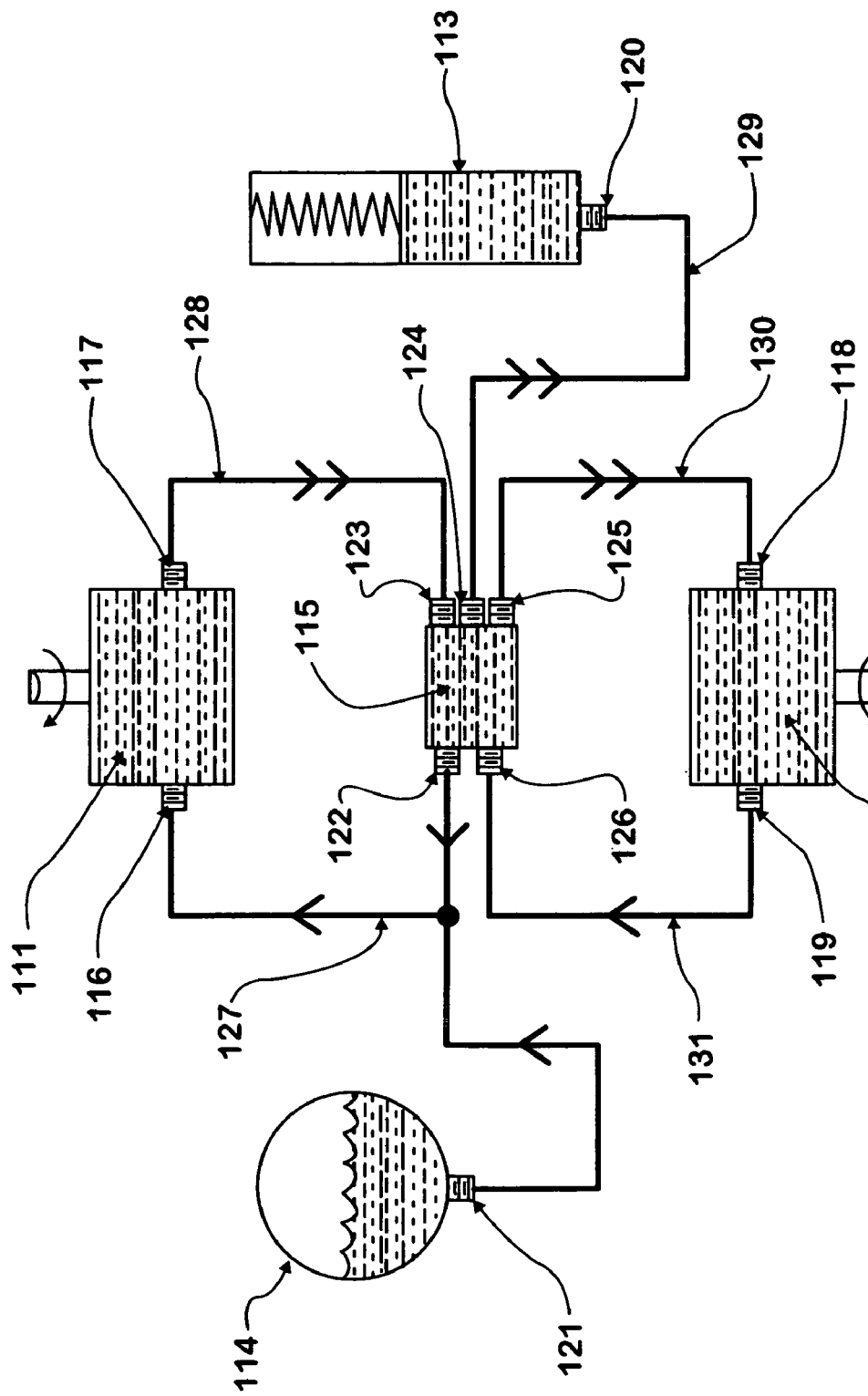

FIG. 8—A flow diagram of a vehicle made in accordance with the first, second, or third embodiments, operating under a combination of "driving" and "storing energy".

Figure 9:
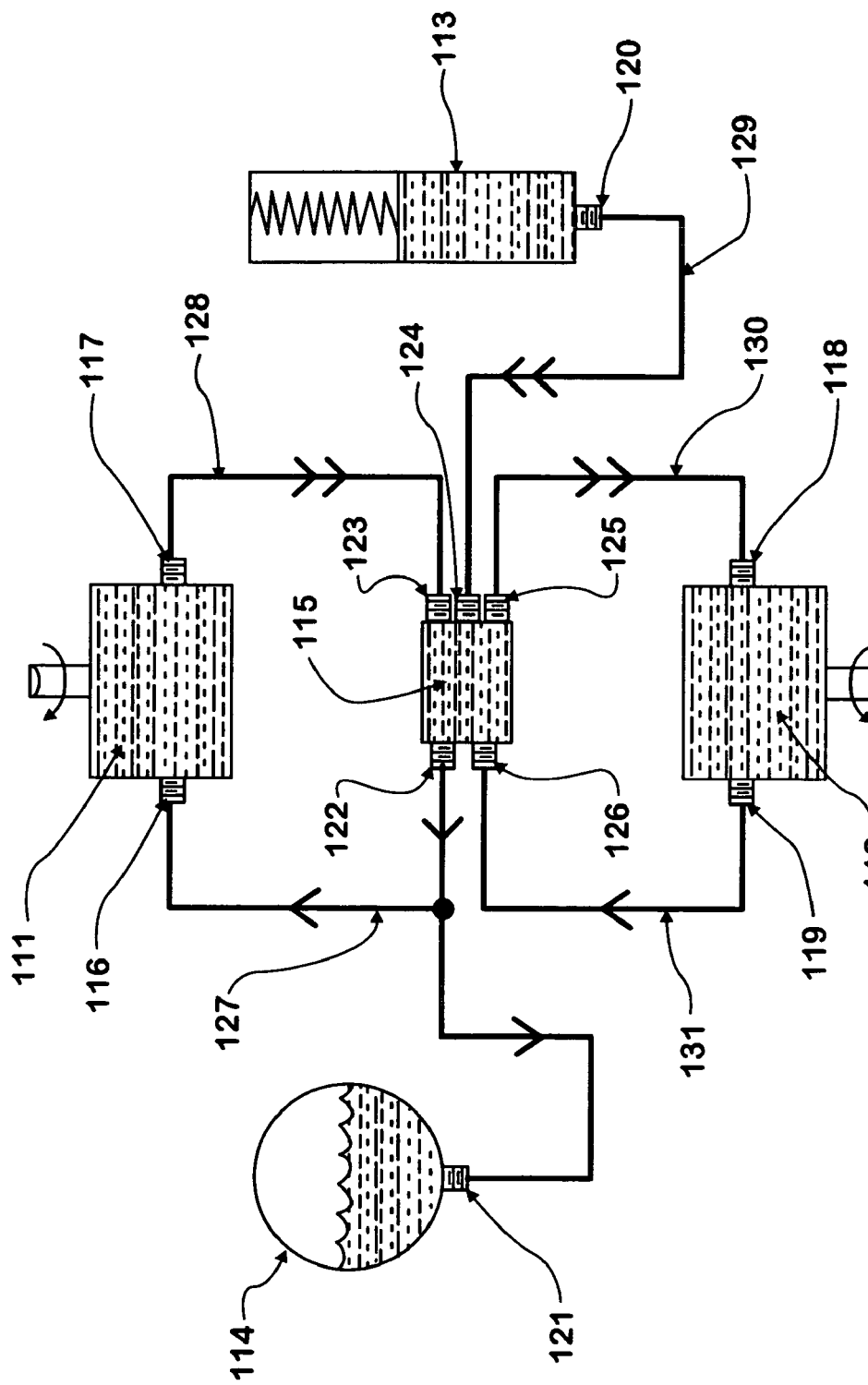

FIG. 9—A flow diagram of a vehicle made in accordance with the first, second, or third embodiments, operating under a combination of "driving" and "recovering energy".

Figure 10:
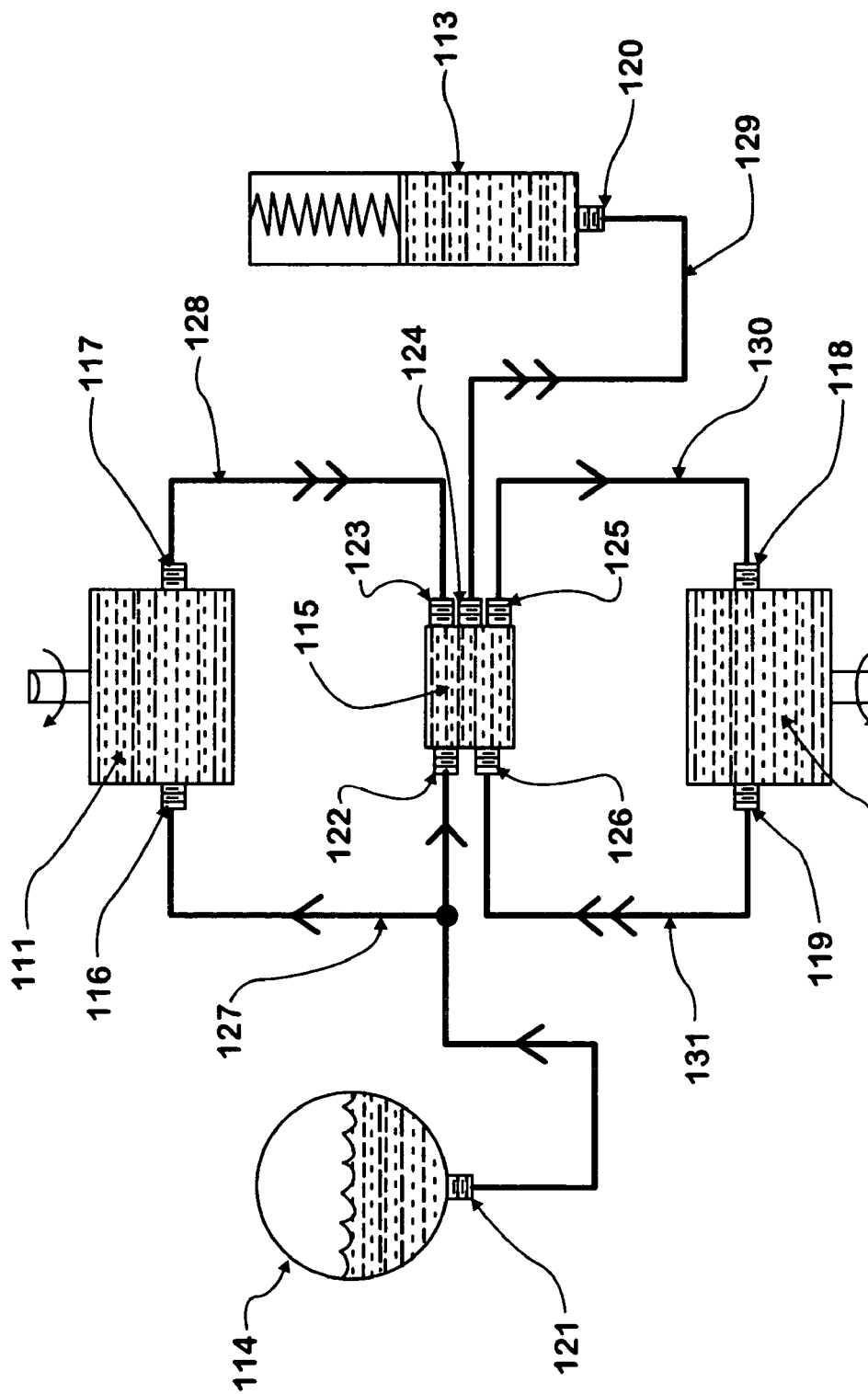

FIG. 10—A flow diagram of a vehicle made in accordance with the first, second, or third embodiments, operating under a combination of "braking" and "storing energy".

Figure 11:
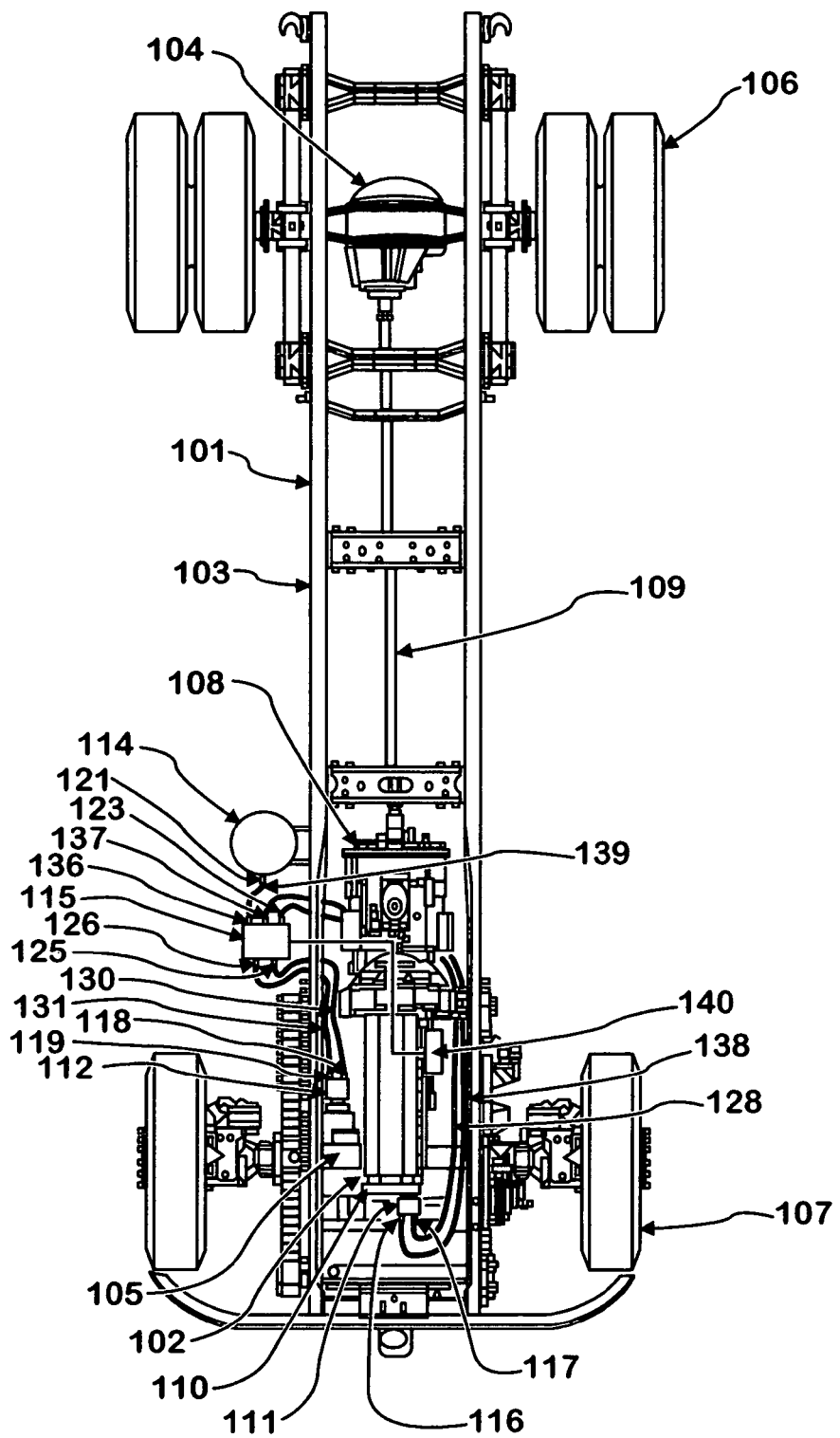

FIG. 11—A top view of a vehicle made in accordance with a fourth embodiment of the invention.

Figure 12:
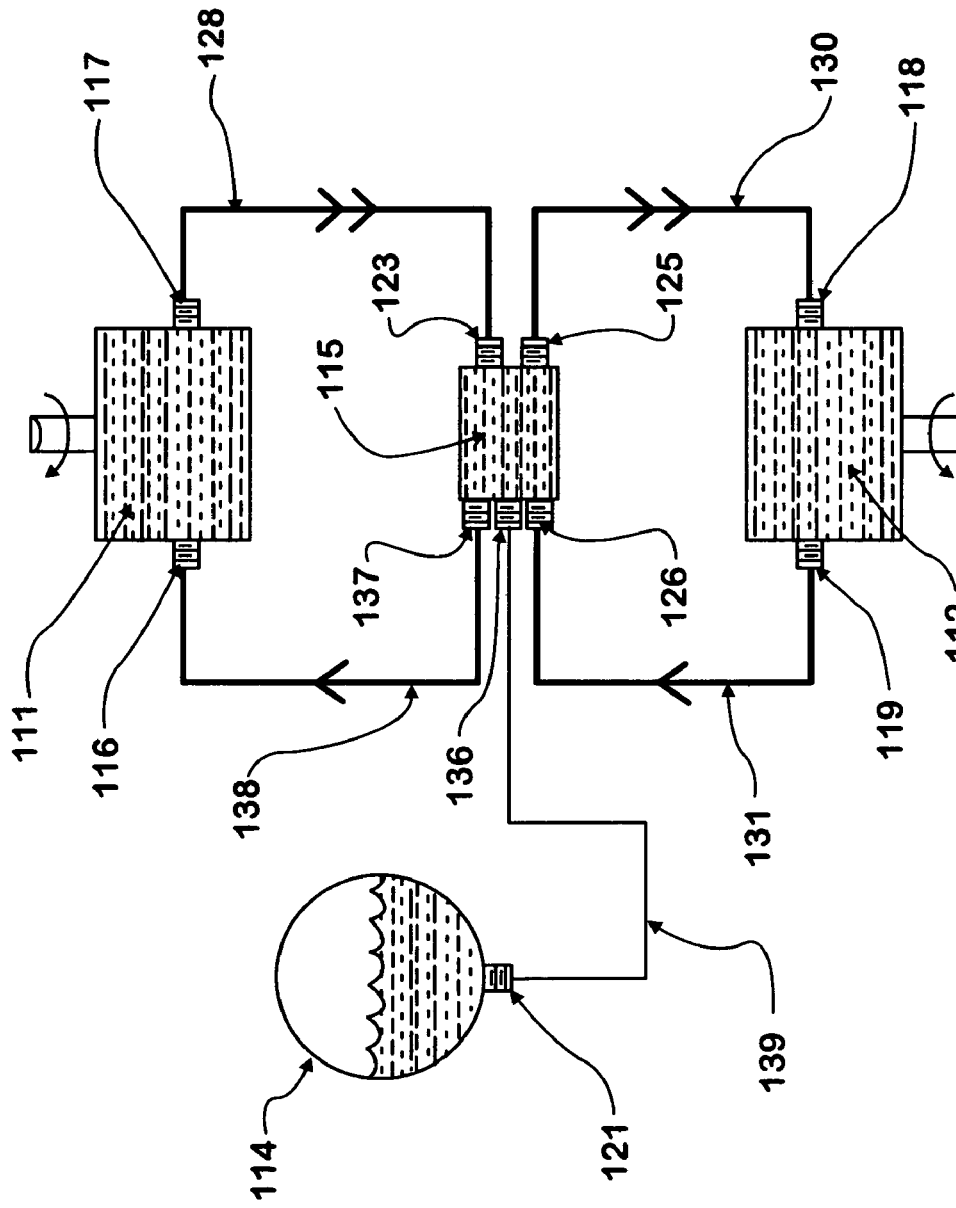

FIG. 12—A flow diagram of a vehicle made in accordance with the fourth embodiment of the invention, operating under "driving" conditions.

Figure 13:
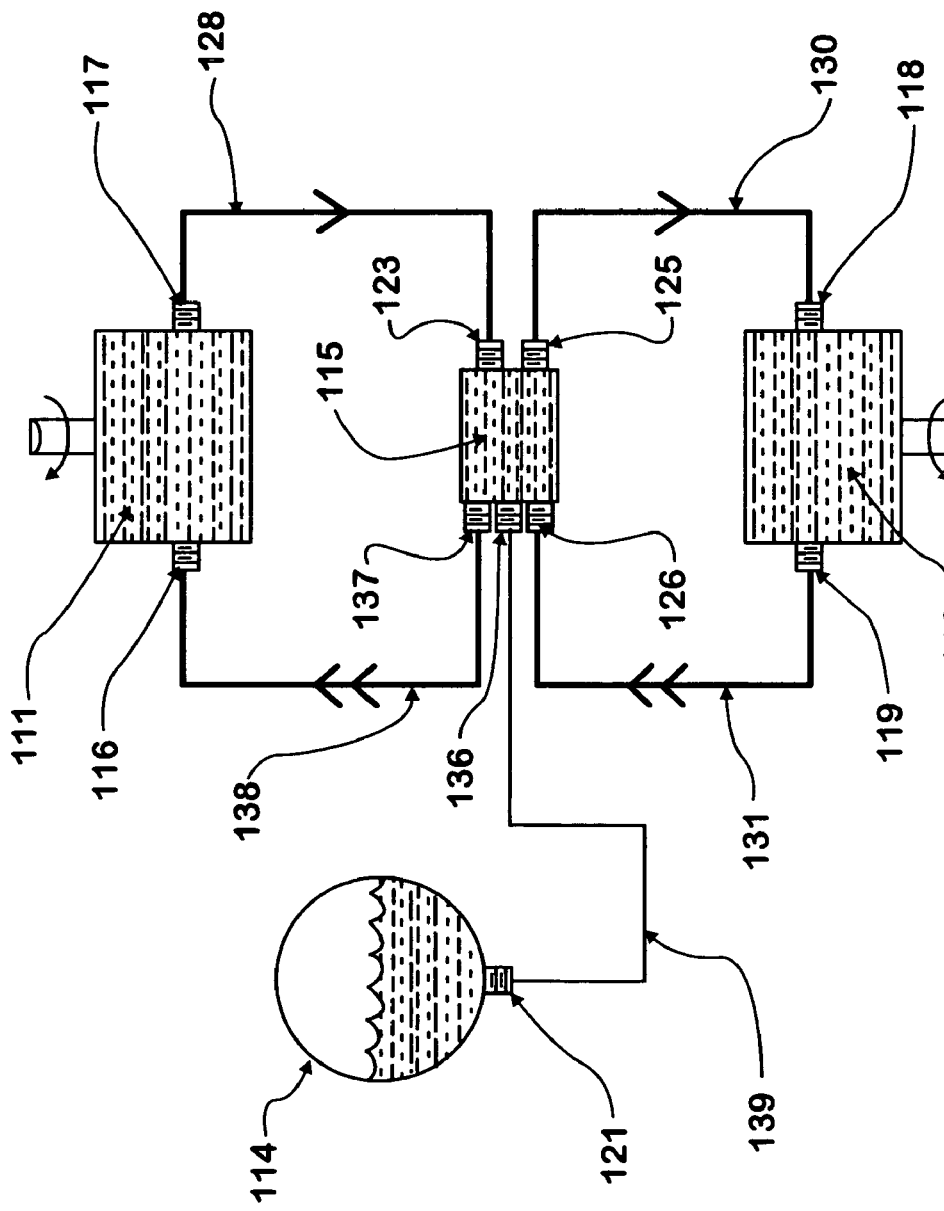

FIG. 13—A flow diagram of a vehicle made in accordance with the fourth embodiment of the invention, operating under "engine braking" conditions.

DETAILED DESCRIPTION

The vehicle 101 shown in FIG. 1 has an engine 102 attached to a chassis 103. The vehicle 101 also has at least one rear axle 104 and one conventional front drive steering axle 105 attached to chassis 103. The rear axle 104 is provided with rear wheel and tire assemblies 106, and the conventional front drive steering axle 105 is provided with front wheel and tire assemblies 107. The engine 102 provides power to a transmission 108, which in turn provides power to a propeller shaft 109. The propeller shaft 109 thereby provides power to rear axle 104 and to rear wheel and tire assemblies 106.

The engine 102 shown in FIG. 1 is provided with a Front Engine Accessory Drive (FEAD) 110, which provides power to an hydraulic pump 111 attached to it. The conventional front drive steering axle 105 is provided with an hydraulic motor 112. The chassis 103 is further provided with an hydraulic pressure accumulator 113, an hydraulic reservoir 114, a control valve 115, and a control means 140. The hydraulic pump 111 is provided with an hydraulic pump inlet port 116 and an hydraulic pump outlet port 117. The hydraulic motor 112 is further provided with an hydraulic motor inlet port 118 and an hydraulic motor outlet port 119. The hydraulic pressure accumulator 113 is also provided with an hydraulic pressure accumulator port 120, and the hydraulic reservoir 114 is provided with an hydraulic reservoir port 121. The control valve 115 is provided with an hydraulic pump and reservoir supply port 122, an hydraulic pump return port 123, an hydraulic pressure accumulator supply port 124, an hydraulic motor supply port 125, and an hydraulic motor return port 126.

FIG. 1 further shows an hydraulic pump and reservoir supply hose assembly 127 connected to the hydraulic pump and reservoir supply port 122, to the hydraulic reservoir port 121, and to the hydraulic pump inlet port 116. An hydraulic pump return hose 128 is connected to the hydraulic pump outlet port 117 and to the hydraulic pump return port 123. An hydraulic pressure accumulator supply hose 129 is connected to the hydraulic pressure accumulator supply port 124 and to the hydraulic pressure accumulator port 120. An hydraulic motor supply hose 130 is connected to the hydraulic motor supply port 125 and to the hydraulic motor inlet port 118. Finally, an hydraulic motor return hose 131 is connected to the hydraulic motor outlet port 119 and to the hydraulic motor return port 126. Additionally, a line is shown extending from control means 140 to control valve 115, representing the electronic or mechanical connection therebetween.

The vehicle 101 shown in FIG. 2 has a similar chassis 103, engine 102, transmission 108, propeller shaft 109, rear axle 104, rear wheel and tire assemblies 106, conventional front drive steering axle 105, front wheel and tire assemblies 107, as the vehicle 101 shown in FIG. 1. An hydraulic motor 112, having an hydraulic motor inlet port 118 and an hydraulic motor outlet port 119, is again shown attached to the conventional front drive steering axle 105. An hydraulic pump 111, having hydraulic pump inlet port 116 and hydraulic pump outlet port 117, is mounted to the chassis 103, and driven by a transmission Power Take-Off (PTO) 132 by means of a Power Take-Off shaft 133. The chassis 103 is again provided with an hydraulic pressure accumulator 113 having an hydraulic pressure accumulator port 120, an hydraulic reservoir 114 having an hydraulic reservoir port 121, a control valve 115, and a control means 140. The control valve 115 is provided with an hydraulic pump and reservoir supply port 122, an hydraulic pump return port 123, an hydraulic pressure accumulator supply port 124, an hydraulic motor supply port 125, and an hydraulic motor return port 126.

FIG. 2 further shows an hydraulic pump and reservoir supply hose assembly 127 connected to the hydraulic pump and reservoir supply port 122, to the hydraulic reservoir port 121, and to the hydraulic pump inlet port 116. An hydraulic pump return hose 128 is connected to the hydraulic pump outlet port 117 and to the hydraulic pump return port 123. An hydraulic pressure accumulator supply hose 129 is connected to the hydraulic pressure accumulator supply port 124 and to the hydraulic pressure accumulator port 120. An hydraulic motor supply hose 130 is connected to the hydraulic motor supply port 125 and to the hydraulic motor inlet port 118. Finally, an hydraulic motor return hose 131 is connected to the hydraulic motor outlet port 119 and to the hydraulic motor return port 126. Additionally, a line is shown extending from control means 140 to control valve 115, representing the electronic or mechanical connection therebetween.

The vehicle 101 shown in FIG. 3 has a similar chassis 103, engine 102, Front Engine Accessory Drive (FEAD) 110, transmission 108, propeller shaft 109, rear axle 104, rear wheel and tire assemblies 106, conventional front drive steering axle 105, front wheel and tire assemblies 107, as the vehicle 101 shown in FIG. 1. An hydraulic motor 112, having an hydraulic motor inlet port 118 and an hydraulic motor outlet port 119, is shown attached to an hydraulic motor mounting bracket 134, which in turn is attached to the chassis 103. The hydraulic motor 112 drives the conventional front drive steering axle 105 by means of a front shaft 135. An hydraulic pump 111, having hydraulic pump inlet port 116 and hydraulic pump outlet port 117, is again shown attached to and driven by the Front Engine Accessory Drive (FEAD) 110. The chassis 103 is provided with an hydraulic pressure accumulator 113 having an hydraulic pressure accumulator port 120, an hydraulic reservoir 114 having an hydraulic reservoir port 121, a control valve 115, and a control means 140. The control valve 115 is again provided with an hydraulic pump and reservoir supply port 122, an hydraulic pump return port 123, an hydraulic pressure accumulator supply port 124, an hydraulic motor supply port 125, and an hydraulic motor return port 126.

FIG. 3 further shows an hydraulic pump and reservoir supply hose assembly 127 connected to the hydraulic pump and reservoir supply port 122, to the hydraulic reservoir port 121, and to the hydraulic pump inlet port 116. An hydraulic pump return hose 128 is connected to the hydraulic pump outlet port 117 and to the hydraulic pump return port 123. An hydraulic pressure accumulator supply hose 129 is connected to the hydraulic pressure accumulator supply port 124 and to the hydraulic pressure accumulator port 120. An hydraulic motor supply hose 130 is connected to the hydraulic motor supply port 125 and to the hydraulic motor inlet port 118. Finally, an hydraulic motor return hose 131 is connected to the hydraulic motor outlet port 119 and to the hydraulic motor return port 126. Additionally, a line is shown extending from control means 140 to control valve 115, representing the electronic or mechanical connection therebetween.

FIG. 4 is a plumbing diagram of the hydraulic system shown in FIG. 1 through FIG. 3. The hydraulic pump 111, the hydraulic motor 112, the hydraulic pressure accumulator 113, the hydraulic reservoir 114, and the control valve 115 are all represented by simple block symbols. The hydraulic pump 111 block symbol is shown with simplified representations of the hydraulic pump inlet port 116 and the hydraulic pump outlet port 117. In the same way, the hydraulic motor 112 block symbol is shown with simplified representations of the hydraulic motor inlet port 118 and the hydraulic motor outlet port 119, the hydraulic pressure accumulator 113 block symbol is shown with a simplified representation of the hydraulic pressure accumulator port 120, the hydraulic reservoir 114 block symbol is shown with a simplified representation of the hydraulic reservoir port 121, and the control valve 115 block symbol is shown with simplified representations of the hydraulic pump and reservoir supply port 122, the hydraulic pump return port 123, the hydraulic pressure accumulator supply port 124, the hydraulic motor supply port 125, and the hydraulic motor return port 126.

A line representing the hydraulic pump and reservoir supply hose assembly 127 is shown in FIG. 4 connected to the simplified representations of the hydraulic pump and reservoir supply port 122, the hydraulic reservoir port 121, and the hydraulic pump inlet port 116. Another line representing the hydraulic pump return hose 128 is shown connected to the simplified representations of the hydraulic pump outlet port 117 and the hydraulic pump return port 123. Another line representing the hydraulic pressure accumulator supply hose 129 is shown connected to the simplified representations of the hydraulic pressure accumulator supply port 124 and the hydraulic pressure accumulator port 120. Another line representing the hydraulic motor supply hose 130 is shown connected to the simplified representations of the hydraulic motor supply port 125 and the hydraulic motor inlet port 118. Finally, a line representing the hydraulic motor return hose 131 is shown connected to the simplified representations of the hydraulic motor outlet port 119 and the hydraulic motor return port 126.

In addition, the line in FIG. 4 representing the hydraulic pump return hose 128 is shown emphasized with double arrows, representing high pressure flow and the direction thereof. In the same way, the line representing the hydraulic motor supply hose 130 is shown emphasized with double arrows. The lines representing the hydraulic motor return hose 131 and the hydraulic pump and reservoir supply hose assembly 127 are shown emphasized with single arrows, representing low pressure flow and the direction thereof. In this manner, the functioning of control valve 115 during the operating condition referred to previously as "driving" is disclosed.

FIG. 5 is a plumbing diagram of the hydraulic system shown in FIG. 1 through FIG. 3, similar to the plumbing diagram shown in FIG. 4. The hydraulic pump 111, the hydraulic motor 112, the hydraulic pressure accumulator 113, the hydraulic reservoir 114, and the control valve 115 are again represented by simple block symbols. The hydraulic pump inlet port 116, the hydraulic pump outlet port 117, the hydraulic motor inlet port 118, the hydraulic motor outlet port 119, the hydraulic pressure-accumulator port 120, the hydraulic reservoir port 121, the hydraulic pump and reservoir supply port 122, the hydraulic pump return port 123, the hydraulic pressure accumulator supply port 124, the hydraulic motor supply port 125, and the hydraulic motor return port 126 are all shown as simplified representations.

FIG. 5 shows lines representing the hydraulic pump and reservoir supply hose assembly 127, the hydraulic pump return hose 128, the hydraulic pressure accumulator supply hose 129, the hydraulic motor supply hose 130, and the hydraulic motor return hose 131, in a configuration similar to the plumbing diagram in FIG. 4. Each representative line is shown connected to the simplified representations of the appropriate ports. The lines representing the hydraulic motor return hose 131 and the hydraulic pressure accumulator supply hose 129 are shown emphasized with double arrows, representing high pressure flow and the direction thereof. The lines representing the hydraulic motor supply hose 130 and the portion of the hydraulic pump and reservoir supply hose assembly 127 leading from the hydraulic reservoir port 121 to the hydraulic pump and reservoir supply port 122 are shown emphasized with single arrows, representing low pressure flow and the direction thereof. In this manner, the functioning of control valve 115 during the operating condition referred to previously as "braking" is disclosed.

FIG. 6 is a plumbing diagram of the hydraulic system shown in FIG. 1 through FIG. 3, similar to the plumbing diagram shown in FIG. 4. The hydraulic pump 111, the hydraulic motor 112, the hydraulic pressure accumulator 113, the hydraulic reservoir 114, and the control valve 115 are again represented by simple block symbols. The hydraulic pump inlet port 116, the hydraulic pump outlet port 117, the hydraulic motor inlet port 118, the hydraulic motor outlet port 119, the hydraulic pressure accumulator port 120, the hydraulic reservoir port 121, the hydraulic pump and reservoir supply port 122, the hydraulic pump return port 123, the hydraulic pressure accumulator supply port 124, the hydraulic motor supply port 125, and the hydraulic motor return port 126 are all shown as simplified representations.

FIG. 6 shows lines representing the hydraulic pump and reservoir supply hose assembly 127, the hydraulic pump return hose 128, the hydraulic pressure accumulator supply hose 129, the hydraulic motor supply hose 130, and the hydraulic motor return hose 131, in a configuration similar to the plumbing diagram in FIG. 4. Each representative line is shown connected to the simplified representations of the appropriate ports. The lines representing the hydraulic pump return hose 128 and the hydraulic pressure accumulator supply hose 129 are shown emphasized with double arrows, representing high pressure flow and the direction thereof. The line representing the portion of the hydraulic pump and reservoir supply hose assembly 127 leading from the hydraulic reservoir port 121 to the hydraulic pump inlet port 116 is shown emphasized with single arrows, representing low pressure flow and the direction thereof. In this manner, the functioning of control valve 115 during the operating condition referred to previously as "storing energy" is disclosed.

FIG. 7 is a plumbing diagram of the hydraulic system shown in FIG. 1 through FIG. 3, similar to the plumbing diagram shown in FIG. 4. The hydraulic pump 111, the hydraulic motor 112, the hydraulic pressure accumulator 113, the hydraulic reservoir 114, and the control valve 115 are again represented by simple block symbols. The hydraulic pump inlet port 116, the hydraulic pump outlet port 117, the hydraulic motor inlet port 118, the hydraulic motor outlet port 119, the hydraulic pressure accumulator port 120, the hydraulic reservoir port 121, the hydraulic pump and reservoir supply port 122, the hydraulic pump return port 123, the hydraulic pressure accumulator supply port 124, the hydraulic motor supply port 125, and the hydraulic motor return port 126 are all shown as simplified representations.

FIG. 7 shows lines representing the hydraulic pump and reservoir supply hose assembly 127, the hydraulic pump return hose 128, the hydraulic pressure accumulator supply hose 129, the hydraulic motor supply hose 130, and the hydraulic motor return hose 131, in a configuration similar to the plumbing diagram in FIG. 4. Each representative line is shown connected to the simplified representations of the appropriate ports. The lines representing the hydraulic pressure accumulator supply hose 129 and the hydraulic motor supply hose 130 are shown emphasized with double arrows, representing high pressure flow and the direction thereof. The lines representing the hydraulic motor return hose 131 and the portion of the hydraulic pump and reservoir supply hose assembly 127 leading from the hydraulic pump and reservoir supply port 122 to the hydraulic reservoir port 121 are shown emphasized with single arrows, representing low pressure flow and the direction thereof. In this manner, the functioning of control valve 115 during the operating condition referred to previously as "recovering energy" is disclosed.

FIG. 8 is a plumbing diagram of the hydraulic system shown in FIG. 1 through FIG. 3, similar to the plumbing diagram shown in FIG. 4. The hydraulic pump 111, the hydraulic motor 112, the hydraulic pressure accumulator 113, the hydraulic reservoir 114, and the control valve 115 are again represented by simple block symbols. The hydraulic pump inlet port 116, the hydraulic pump outlet port 117, the hydraulic motor inlet port 118, the hydraulic motor outlet port 119, the hydraulic pressure accumulator port 120, the hydraulic reservoir port 121, the hydraulic pump and reservoir supply port 122, the hydraulic pump return port 123, the hydraulic pressure accumulator supply port 124, the hydraulic motor supply port 125, and the hydraulic motor return port 126 are all shown as simplified representations.

FIG. 8 shows lines representing the hydraulic pump and reservoir supply hose assembly 127, the hydraulic pump return hose 128, the hydraulic pressure accumulator supply hose 129, the hydraulic motor supply hose 130, and the hydraulic motor return hose 131, in a configuration similar to the plumbing diagram in FIG. 4. Each representative line is shown connected to the simplified representations of the appropriate ports. The lines representing the hydraulic pump return hose 128, the hydraulic pressure accumulator supply hose 129, and the hydraulic motor supply hose 130 are shown emphasized with double arrows, representing high pressure flow and the direction thereof. The lines representing the hydraulic pump and reservoir supply hose assembly 127 and the hydraulic motor return hose 131 are shown emphasized with single arrows, representing low pressure flow and the direction thereof. In this manner, the functioning of control valve 115 during the combination of operating conditions referred to previously as "driving" and "storing energy" is disclosed.

FIG. 9 is a plumbing diagram of the hydraulic system shown in FIG. 1 through FIG. 3, similar to the plumbing diagram shown in FIG. 4. The hydraulic pump 111, the hydraulic motor 112, the hydraulic pressure accumulator 113, the hydraulic reservoir 114, and the control valve 115 are again represented by simple block symbols. The hydraulic pump inlet port 116, the hydraulic pump outlet port 117, the hydraulic motor inlet port 118, the hydraulic motor outlet port 119, the hydraulic pressure accumulator port 120, the hydraulic reservoir port 121, the hydraulic pump and reservoir supply port 122, the hydraulic pump return port 123, the hydraulic pressure accumulator supply port 124, the hydraulic motor supply port 125, and the hydraulic motor return port 126 are all shown as simplified representations.

FIG. 9 shows lines representing the hydraulic pump and reservoir supply hose assembly 127, the hydraulic pump return hose 128, the hydraulic pressure accumulator supply hose 129, the hydraulic motor supply hose 130, and the hydraulic motor return hose 131, in a configuration similar to the plumbing diagram in FIG. 4. Each representative line is shown connected to the simplified representations of the appropriate ports. The lines representing the hydraulic pump return hose 128, the hydraulic pressure accumulator supply hose 129, and the hydraulic motor supply hose 130 are shown emphasized with double arrows, representing high pressure flow and the direction thereof. The lines representing the hydraulic pump and reservoir supply hose assembly 127 and the hydraulic motor return hose 131 are shown emphasized with single arrows, representing low pressure flow and the direction thereof. In this manner, the functioning of control valve 115 during the combination of operating conditions referred to previously as "driving" and "recovering energy" is disclosed.

FIG. 10 is a plumbing diagram of the hydraulic system shown in FIG. 1 through FIG. 3, similar to the plumbing diagram shown in FIG. 4. The hydraulic pump 111, the hydraulic motor 112, the hydraulic pressure accumulator 113, the hydraulic reservoir 114, and the control valve 115 are again represented by simple block symbols. The hydraulic pump inlet port 116, the hydraulic pump outlet port 117, the hydraulic motor inlet port 118, the hydraulic motor outlet port 119, the hydraulic pressure accumulator port 120, the hydraulic reservoir port 121, the hydraulic pump and reservoir supply port 122, the hydraulic pump return port 123, the hydraulic pressure accumulator supply port 124, the hydraulic motor supply port 125, and the hydraulic motor return port 126 are all shown as simplified representations.

FIG. 10 shows lines representing the hydraulic pump and reservoir supply hose assembly 127, the hydraulic pump return hose 128, the hydraulic pressure accumulator supply hose 129, the hydraulic motor supply hose 130, and the hydraulic motor return hose 131, in a configuration similar to the plumbing diagram in FIG. 4. Each representative line is shown connected to the simplified representations of the appropriate ports. The lines representing the hydraulic pump return hose 128, the hydraulic pressure accumulator supply hose 129, and the hydraulic motor return hose 131 are shown emphasized with double arrows, representing high pressure flow and the direction thereof. The lines representing the hydraulic pump and reservoir supply hose assembly 127 and the hydraulic motor supply hose 130 are shown emphasized with single arrows, representing low pressure flow and the direction thereof. In this manner, the functioning of control valve 115 during the combination of operating conditions referred to previously as "braking" and "storing energy" is disclosed.

The vehicle 101 shown in FIG. 11 has a similar chassis 103, engine 102, transmission 108, propeller shaft 109, rear axle 104, rear wheel and tire assemblies 106, conventional front drive steering axle 105, front wheel and tire assemblies 107 as the vehicle 101 shown in FIG. 1. The engine 102 shown in FIG. 11 is again provided with a Front Engine Accessory Drive (FEAD) 110, which provides power to an hydraulic pump 111 attached to it. The conventional front drive steering axle 105 is again provided with an hydraulic motor 112. The chassis 103 is further provided with an hydraulic reservoir 114, a control valve 115, and a control means 140. The hydraulic pump 111 is provided with an hydraulic pump inlet port 116 and an hydraulic pump outlet port 117. The hydraulic motor 112 is further provided with an hydraulic motor inlet port 118 and an hydraulic motor outlet port 119. The hydraulic reservoir 114 is provided with an hydraulic reservoir port 121. The control valve 115 is provided with an hydraulic pump supply port 137, an hydraulic pump return port 123, an hydraulic motor supply port 125, an hydraulic motor return port 126, and an hydraulic reservoir supply port 136.

FIG. 11 further shows an hydraulic pump supply hose 138 connected to the hydraulic pump supply port 137 and to the hydraulic pump inlet port 116. An hydraulic pump return hose 128 is connected to the hydraulic pump outlet port 117 and to the hydraulic pump return port 123. An hydraulic motor supply hose 130 is connected to the hydraulic motor supply port 125 and to the hydraulic motor inlet port 118. An hydraulic motor return hose 131 is connected to the hydraulic motor outlet port 119 and to the hydraulic motor return port 126. Finally, an hydraulic reservoir supply hose 139 is connected to the hydraulic reservoir supply port 136 and to the hydraulic reservoir port 121. Additionally, a line is shown extending from control means 140 to control valve 115, representing the electronic or mechanical connection therebetween.

FIG. 12 is a plumbing diagram of the hydraulic system shown in FIG. 11. The hydraulic pump 111, the hydraulic motor 112, the hydraulic reservoir 114, and the control valve 115 are all represented by simple block symbols. The hydraulic pump 111 block symbol is shown with simplified representations of the hydraulic pump inlet port 116 and the hydraulic pump outlet port 117. In the same way, the hydraulic motor 112 block symbol is shown with simplified representations of the hydraulic motor inlet port 118 and the hydraulic motor outlet port 119, the hydraulic reservoir 114 block symbol is shown with a simplified representation of the hydraulic reservoir port 121, and the control valve 115 block symbol is shown with simplified representations of the hydraulic pump supply port 137, the hydraulic pump return port 123, the hydraulic motor supply port 125, the hydraulic motor return port 126, and the hydraulic reservoir supply port 136.

A line representing the hydraulic pump supply hose 138 is shown in FIG. 12 connected to the simplified representations of the hydraulic pump supply port 137 and the hydraulic pump inlet port 116. Another line representing the hydraulic pump return hose 128 is shown connected to the simplified representations of the hydraulic pump outlet port 117 and the hydraulic pump return port 123. Another line representing the hydraulic motor supply hose 130 is shown connected to the simplified representations of the hydraulic motor supply port 125 and the hydraulic motor inlet port 118. Another line representing the hydraulic motor return hose 131 is shown connected to the simplified representations of the hydraulic motor outlet port 119 and the hydraulic motor return port 126. Finally, a line representing the hydraulic reservoir supply hose 139 is shown connected to the simplified representations of the hydraulic reservoir supply port 136 and the hydraulic reservoir port 121.

In addition, the lines in FIG. 12 representing the hydraulic pump return hose 128 and the hydraulic motor supply hose 130 are shown emphasized with double arrows, representing high pressure flow and the direction thereof. In the same way, the lines representing the hydraulic motor return hose 131, the hydraulic pump supply hose 138, and the hydraulic reservoir supply hose 139 are shown emphasized with single arrows, representing low pressure flow and the direction thereof. In this manner, the functioning of control valve 115 during the operating condition referred to previously as "driving" is disclosed.

FIG. 13 is a plumbing diagram of the hydraulic system shown in FIG. 11, similar to the plumbing diagram shown in FIG. 12. The hydraulic pump 111, the hydraulic motor 112, the hydraulic reservoir 114, and the control valve 115 are again represented by simple block symbols. The hydraulic pump inlet port 116, the hydraulic pump outlet port 117, the hydraulic motor inlet port 118, the hydraulic motor outlet port 119, the hydraulic reservoir port 121, the hydraulic pump supply port 137, the hydraulic pump return port 123, the hydraulic motor supply port 125, the hydraulic motor return port 126, and the hydraulic reservoir supply port 137 are all shown as simplified representations.

FIG. 13 shows lines representing the hydraulic pump supply hose 138, the hydraulic pump return hose 128, the hydraulic motor supply hose 130, the hydraulic motor return hose 131, and the hydraulic reservoir supply hose 139, in a configuration similar to the plumbing diagram in FIG. 12. Each representative line is shown connected to the simplified representations of the appropriate ports. The lines representing the hydraulic motor return hose 131 and the hydraulic pump supply hose 138 are shown emphasized with double arrows, representing high pressure flow and the direction thereof. The lines representing the hydraulic pump return hose 128, the hydraulic motor supply hose 130, and the hydraulic reservoir supply hose 139 are shown emphasized with single arrows, representing low pressure flow and the direction thereof. In this manner, the functioning of control valve 115 during the operating condition referred to previously as "engine braking" is disclosed.

Other permutations of the invention are possible without departing from the teachings disclosed herein, provided that the function of the invention is to provide a simple installation of an hybrid four wheel drive system by utilizing a conventional front drive steering driven by an hydraulic motor. Other advantages to a vehicle 101 equipped with an hybrid four wheel drive system may also be inherent in the invention, without having been described above.

I claim:

1. A mobile vehicle for operation on the ground, comprising:
    an engine attached to a chassis;
    a transmission attached to said engine;
    at least one rear axle attached to said chassis, said at least one rear axle receiving power from said engine through said transmission;
    a conventional driving front steer axle attached to said chassis;
    an hydraulic pump coupled to said engine;
    an hydraulic motor coupled to said conventional driving front steer axle, said hydraulic motor being operable to convert hydraulic power to mechanical power, said mechanical power being used by said conventional driving front steer axle to propel said mobile vehicle for operation on the ground;
    an hydraulic pressure accumulator attached to said chassis;
    at least one control valve, said at least one control valve regulating the hydraulic flow and pressure between said hydraulic pump, said hydraulic motor, and said hydraulic pressure accumulator;
    means for controlling said at least one control valve; and
    said hydraulic pump being directly attached to said engine.

2. The vehicle of claim 1, wherein:
    said engine being provided with a front engine accessory drive; and
    said hydraulic pump being attached to said front engine accessory drive.

3. The vehicle of claim 1, wherein:
    said transmission being provided with a power take-off; and
    said hydraulic pump being attached to said chassis, said hydraulic pump receiving power from said engine through said power take-off.

4. The vehicle of claim 1, wherein:
    said hydraulic motor being directly attached to said conventional driving front steer axle.

5. The vehicle of claim 1, wherein:
    said hydraulic motor being integrated into said conventional driving front steer axle.

6. The vehicle of claim 1, wherein:
    said chassis being provided with a support structure;
    said hydraulic motor being attached to said support structure; and
    said hydraulic motor being coupled to said conventional driving front steer axle by a shaft.

7. The vehicle of claim 1, wherein:
    said at least one control valve being operable to selectively cause said hydraulic pump to provide hydraulic power to said hydraulic motor.

8. The vehicle of claim 1, wherein:
    said at least one control valve being operable to selectively cause said hydraulic motor to provide hydraulic power to said hydraulic pressure accumulator.

9. The vehicle of claim 1, wherein:
    said at least one control valve being operable to selectively cause said hydraulic pump to provide hydraulic power to said hydraulic pressure accumulator.

10. The vehicle of claim 1, wherein:
    said at least one control valve being operable to selectively cause said hydraulic pressure accumulator to provide hydraulic power to said hydraulic motor.

11. The vehicle of claim 1, wherein:
said hydraulic pump being capable of variable hydraulic displacement per revolution of said engine.

12. A mobile vehicle for operation on the ground, comprising:
an engine attached to a chassis;
a transmission attached to said engine;
at least one rear axle attached to said chassis, said at least one rear axle receiving power from said engine through said transmission;
a conventional driving front steer axle attached to said chassis;
an hydraulic pump coupled to said engine;
an hydraulic motor coupled to said conventional driving front steer axle, said hydraulic motor being operable to convert hydraulic power to mechanical power, said mechanical power being used by said conventional driving front steer axle to propel said mobile vehicle for operation on the ground;
at least one control valve, said at least one control valve regulating the hydraulic flow and pressure between said hydraulic pump and said hydraulic motor;
means for controlling said at least one control valve; and
said hydraulic pump being directly attached to said engine.

13. The vehicle of claim 12, wherein:
said engine being provided with a front engine accessory drive; and
said hydraulic pump being attached to said front engine accessory drive.

14. The vehicle of claim 12, wherein:
said transmission being provided with a power take-off; and
said hydraulic pump being attached to said chassis, said hydraulic pump receiving power from said engine through said power take-off.

15. The vehicle of claim 12, wherein:
said hydraulic motor being directly attached to said conventional driving front steer axle.

16. The vehicle of claim 12, wherein:
said hydraulic motor being integrated into said conventional driving front steer axle.

17. The vehicle of claim 12, wherein:
said chassis being provided with a support structure;
said hydraulic motor being attached to said support structure; and
said hydraulic motor being coupled to said conventional driving front steer axle by a shaft.

18. The vehicle of claim 12, wherein:
said at least one control valve being operable to selectively cause said hydraulic pump to provide hydraulic power to said hydraulic motor.

19. The vehicle of claim 12, wherein:
said hydraulic pump being capable of variable hydraulic displacement per revolution of said engine.

* * * * *